(12) United States Patent
Shiba et al.

(10) Patent No.: US 10,981,063 B2
(45) Date of Patent: Apr. 20, 2021

(54) VIDEO GAME PROCESSING APPARATUS AND VIDEO GAME PROCESSING PROGRAM PRODUCT

(71) Applicant: SQUARE ENIX CO., LTD., Tokyo (JP)

(72) Inventors: Takamasa Shiba, Tokyo (JP); Kazuhiro Harada, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/886,241

(22) Filed: Feb. 1, 2018

(65) Prior Publication Data

US 2018/0154262 A1 Jun. 7, 2018

Related U.S. Application Data

(63) Continuation of application No. 14/771,857, filed as application No. PCT/JP2013/001576 on Mar. 11, 2013, now abandoned.

(51) Int. Cl.
*A63F 13/00* (2014.01)
*A63F 13/54* (2014.01)
(Continued)

(52) U.S. Cl.
CPC .............. *A63F 13/54* (2014.09); *A63F 13/25* (2014.09); *A63F 13/46* (2014.09); *A63F 13/53* (2014.09); *A63F 13/69* (2014.09); *A63F 13/822* (2014.09)

(58) Field of Classification Search
CPC .......... A63F 13/25; A63F 13/44; A63F 13/46; A63F 13/53; A63F 13/54; A63F 13/69; A63F 2300/8047
See application file for complete search history.

(56) References Cited

U.S. PATENT DOCUMENTS 2,436,725 A 2/1948 Morrison
7,916,679 B2 3/2011 Kaku et al.
(Continued)

FOREIGN PATENT DOCUMENTS

EP 1759744 3/2007
JP 6-31056 2/1994
(Continued)

OTHER PUBLICATIONS

International Search Report for PCT/JP2013/001576, dated Jun. 11, 2013.
(Continued)

*Primary Examiner* — Justin L Myhr
(74) *Attorney, Agent, or Firm* — Greenblum & Bernstein, P.L.C.

(57) ABSTRACT

A video game processing apparatus stores music information indicating music, the music being constructed by a plurality of tracks, the music being reproduced with plural kinds of reproducing styles by reproducing an arbitrary combination of one or two or more tracks; stores music reproducing style information, the music reproducing style information indicating a reproducing style of music according to a game point value; starts reproduction with a reproducing style according to the game point value; reproduces the music indicated by the music information; updates the game point value in accordance with a progress status of the video game; refers to the updated game point value and the music reproducing style information to determine whether the reproducing style of the reproduced music is to be updated or not; and updates the reproducing style of the reproduced music to a reproducing style according to the updated game point value.

19 Claims, 4 Drawing Sheets

MUSIC REPRODUCING STYLE INFORMATION

| | PART | REPRODUCING STYLE | | | |
|---|---|---|---|---|---|
| | | LEVEL 1 | LEVEL 2 | ... | LEVEL 10 |
| | | 0 ≤ POINT VALUE (p) < 10 | 10 ≤ POINT VALUE (p) < 20 | ... | 90 ≤ POINT VALUE (p) ≤ 100 |
| MUSIC A | VOCAL (V) | Volume1/♪ = 60 | Volume1/♪ = 65 | ... | Volume3/♪ = 100 |
| | GUITAR (G) | Volume0/♪ = 60 | Volume1/♪ = 65 | ... | Volume3/♪ = 100 |
| | BASE (B) | Volume0/♪ = 60 | Volume1/♪ = 65 | ... | Volume3/♪ = 100 |
| | DRUM (D) | Volume1/♪ = 60 | Volume1/♪ = 65 | ... | Volume4/♪ = 100 |
| MUSIC B | VOCAL (V) | Volume0/♪ = 110 | Volume1/♪ = 113 | ... | Volume3/♪ = 125 |
| | GUITAR (G) | Volume0/♪ = 110 | Volume0/♪ = 113 | ... | Volume0/♪ = 125 |
| | BASE (B) | Volume1/♪ = 110 | Volume1/♪ = 113 | ... | Volume0/♪ = 125 |
| | DRUM (D) | Volume1/♪ = 110 | Volume1/♪ = 113 | ... | Volume4/♪ = 125 |
| | ⋮ | ⋮ | ⋮ | ... | ⋮ |
| | ⋮ | ⋮ | ⋮ | ... | ⋮ |

(51) Int. Cl.
*A63F 13/25* (2014.01)
*A63F 13/69* (2014.01)
*A63F 13/46* (2014.01)
*A63F 13/53* (2014.01)
*A63F 13/822* (2014.01)

(56) References Cited

U.S. PATENT DOCUMENTS

| | | | |
|---|---|---|---|
| 8,408,997 | B2 | 4/2013 | Miyagawa |
| 2002/0101423 | A1 | 8/2002 | Matsuura |
| 2003/0037664 | A1 | 2/2003 | Comair |
| 2005/0026687 | A1 | 2/2005 | Watanabe |
| 2005/0036628 | A1* | 2/2005 | Devito .............. G11B 27/034 381/61 |
| 2006/0073881 | A1* | 4/2006 | Pryzby .............. G07F 17/32 463/20 |
| 2007/0286109 | A1 | 12/2007 | Kaku et al. |
| 2008/0194328 | A1 | 8/2008 | Shimizu et al. |
| 2013/0023343 | A1 | 1/2013 | Schmidt |
| 2013/0196737 | A1* | 8/2013 | Kitamura .............. G07F 17/326 463/20 |

FOREIGN PATENT DOCUMENTS

| | | |
|---|---|---|
| JP | 10-337379 | 12/1998 |
| JP | 10337379 | 12/1998 |
| JP | 2000-185175 | 7/2000 |
| JP | 2001-246156 | 9/2001 |
| JP | 2003-251076 | 9/2003 |
| JP | 2003-340149 | 12/2003 |
| JP | 2004-148111 | 5/2004 |
| JP | 2004-187706 | 7/2004 |
| JP | 2004187706 | 7/2004 |
| JP | 2005-287787 | 10/2005 |
| JP | 2007-295521 | 11/2007 |
| WO | 2005107904 | 11/2005 |

OTHER PUBLICATIONS

Yossy's Story, Wikipedia, Feb. 27, 2012, http://ja.wikipedia.org/w/index.php?title=ヨッシーストーリー&oldid=41417309.

Japanese Office Action for Japanese Application No. 2015-505072 dated Mar. 7, 2017 including English translation thereof.

Japanese Office Action issued in Japanese Patent Application No. 2015-505072 dated Oct. 3, 2017 along with partial English translation.

Yukihiko Matsumoto, Orthopedics, Trauma Team—Disclosure of Operative Surgical Procedure vol. 1, Aug. 11, 2010, 10 pages, along with partial English translation.

Kazuo Ishii, Mr. Koji Kondo of Nintendo, Talk About Sound of 'Mario' and 'Zelda', Various Method Making Interactive Game Sound, Game Watch, Mar. 8, 2007, http://game.watch.impress.co.jp/docs/20070308/kondo.htm , along with partial English translation.

Seji Nakamura, CRI and Gust Introduce Implemental Case of 'Adaptive Music', What is the 'Adaptive Music' to Change Game Sound, Game Watch, Sep. 3, 2009, http://game.watch.impress.co.jp/docs/news/312813 , along with partial English translation.

Robert Greene, Skies of Arcadia,Jul. 30, 2016, hardcoregaming101, <http://www.hardcoregaming101.net/skiesofarcadia/skiesofarcadia.htm> and Dreamcast, Jan. 16, 2006, Wiki <https://en.wikipedia.org/w/index.php?title=Dreamcast&oldid=35366787>.

Battle Theme Music, Feb. 8, 2012, http://tvtropes.org/, <http://web.archive.org/web/20120208130843/http://tvtropes.org/pmwiki/pmwiki.php/Main/BattleThemeMusic>.

Satoshi Yoneda: [CEDEC 2012] "Uninterrupted BGM" of PSO 2 is done like this. Sega's "Procedural Generation of BGM", 4Gamer. net, Aug. 21, 2012, http://www.4gamer.net/games/120/G012075/20120820076/ along with a partial English translation.

Decision to Decline an Amendment of the corresponding Japanese Application No. 2015-505072 dated Jul. 3, 2018 along with an English translation.

Japanese Office Action dated Sep. 3, 2019 issued in Japanese Patent Application No. 2018188688.

Wikipedia[Yoshi's Story] dated Feb. 27, 2012.

* cited by examiner

Fig. 2

MUSIC INFORMATION

|  | PART | SOUND DATA |
|---|---|---|
| MUSIC A | VOCAL (V) | ... |
|  | GUITAR (G) | ... |
|  | BASE (B) | ... |
|  | DRUM (D) | ... |
| MUSIC B | VOCAL (V) | ... |
|  | GUITAR (G) | ... |
|  | BASE (B) | ... |
|  | DRUM (D) | ... |
|  | ⋮ | ... |
| ⋮ | ⋮ | ... |

Fig. 3

MUSIC REPRODUCING STYLE INFORMATION

|  | PART | REPRODUCING STYLE | | | |
|---|---|---|---|---|---|
|  |  | LEVEL 1 | LEVEL 2 | ... | LEVEL 10 |
|  |  | 0 ≦ POINT VALUE (p) < 10 | 10 ≦ POINT VALUE (p) < 20 | ... | 90 ≦ POINT VALUE (p) ≦ 100 |
| MUSIC A | VOCAL (V) | Volume1/♪ = 60 | Volume1/♪ = 65 | ... | Volume3/♪ = 100 |
|  | GUITAR (G) | Volume0/♪ = 60 | Volume1/♪ = 65 | ... | Volume3/♪ = 100 |
|  | BASE (B) | Volume0/♪ = 60 | Volume1/♪ = 65 | ... | Volume3/♪ = 100 |
|  | DRUM (D) | Volume1/♪ = 60 | Volume1/♪ = 65 | ... | Volume4/♪ = 100 |
| MUSIC B | VOCAL (V) | Volume0/♪ = 110 | Volume1/♪ = 113 | ... | Volume3/♪ = 125 |
|  | GUITAR (G) | Volume0/♪ = 110 | Volume0/♪ = 113 | ... | Volume0/♪ = 125 |
|  | BASE (B) | Volume1/♪ = 110 | Volume1/♪ = 113 | ... | Volume0/♪ = 125 |
|  | DRUM (D) | Volume1/♪ = 110 | Volume1/♪ = 113 | ... | Volume4/♪ = 125 |
|  | ⋮ | ⋮ | ⋮ | ... | ⋮ |
| ⋮ | ⋮ | ⋮ | ⋮ | ... | ⋮ |

Fig. 4

APPEARANCE STYLE INFORMATION

| CHARACTER TYPE | APPEARANCE STYLE | | | |
|---|---|---|---|---|
| | LEVEL 1 | LEVEL 2 | LEVEL 3 | LEVEL 4 |
| | $0 \leq p < 25$ | $25 \leq p < 50$ | $50 \leq p < 75$ | $75 \leq p \leq 100$ |
| CHARACTER A | APPEARANCE a | APPEARANCE b | APPEARANCE c | APPEARANCE d |
| CHARACTER B | APPEARANCE e | APPEARANCE f | APPEARANCE g | APPEARANCE h |
| ⋮ | ⋮ | ⋮ | ⋮ | ⋮ |

Fig. 5

SPECIAL MODE MUSIC
REPRODUCING STYLE INFORMATION

| | PART | REPRODUCING STYLE |
|---|---|---|
| MUSIC A | VOCAL (V) | Volume5/ ♪ = 130 |
| | GUITAR (G) | Volume4/ ♪ = 130 |
| | BASE (B) | Volume4/ ♪ = 130 |
| | DRUM (D) | Volume4/ ♪ = 130 |
| MUSIC B | VOCAL (V) | Volume5/ ♪ = 145 |
| | GUITAR (G) | Volume5/ ♪ = 145 |
| | BASE (B) | Volume5/ ♪ = 145 |
| | DRUM (D) | Volume4/ ♪ = 145 |
| | ⋮ | ... |
| ⋮ | ⋮ | ... |

VIDEO GAME PROCESSING APPARATUS AND VIDEO GAME PROCESSING PROGRAM PRODUCT

CROSS REFERENCE TO RELATED APPLICATIONS

The present application is a Continuation Application of the pending U.S. patent application Ser. No. 14/771,857, filed on Sep. 1, 2015, which is a U.S. national phase application under 35 U.S.C. § 371 of PCT Application No. PCT/JP2013/001576, filed on Mar. 11, 2013.

FIELD OF THE INVENTION

The present invention relates to a technique to control progress of a video game.

BACKGROUND OF THE INVENTION

Heretofore, there is a video game in which BGM is switched by selectively reading out BGM (Background Music) in accordance with progress of the video game (see Patent Literature 1).

PRIOR ART DOCUMENTS

Patent Literature

[Patent Literature 1]
Japanese Patent Application Publication No. H6-31056

SUMMARY OF THE INVENTION

Problem to be Solved by the Invention

Such a video game can switch BGM in a variety of forms in accordance with a progress status of the video game. However, there has a problem that a sense of discomfort is given a user before and after the BGM is switched. Namely, there has been a problem that such a video game cannot provide a smooth BGM change.

It is an object of the present invention to carry out a BGM control according to progress of a video game without giving a user a sense of discomfort.

Means for Solving the Problem

A video game processing apparatus according to the present invention is a video game processing apparatus for controlling progress of a video game, including: a music information storage section configured to store music information indicating music, the music being constructed by a plurality of tracks, the music being reproduced with plural kinds of reproducing styles by reproducing an arbitrary combination of one or two or more tracks; a music reproducing style information storage section configured to store music reproducing style information, the music reproducing style information indicating a reproducing style of music according to a game point value, the game point value denoting a value of a game point that changes in accordance with a progress status of the video game; a music reproducing section configured to start reproduction with a reproducing style according to the game point value, the music reproducing section being configured to reproduce the music indicated by the music information; a point value updating section configured to update the game point value in accordance with the progress status of the video game; a music reproducing style update determining section configured to refer to the game point value updated by the point value updating section and the music reproducing style information to determine whether the reproducing style of the music reproduced by the music reproducing section is to be updated or not; and a music reproducing style updating section configured to update the reproducing style of the music reproduced by the music reproducing section to a reproducing style according to the game point value updated by the point value updating section in a case where the music reproducing style update determining section determines that the reproducing style is to be updated.

By configuring the video game processing apparatus as described above, it becomes possible to carry out a BGM control according to progress of a video game without giving a user a sense of discomfort.

It is preferable that the video game processing apparatus is configured to further include: a special mode music reproducing style information storage section configured to store special mode music reproducing style information, the special mode music reproducing style information indicating a reproducing style of the music in a special mode, the special mode denoting a mode to which the video game is shifted when a predetermined condition is satisfied; a special mode shifting possibility determining section configured to refer to the game point value updated by the point value updating section to determine whether it can shift to the special mode or not; and a special mode shifting section configured to refer to the special mode music reproducing style information storage section to update the reproducing style of the music reproduced by the music reproducing section and to shift the video game to the special mode in a case where the special mode shifting possibility determining section determines that the video game can be shifted to the special mode.

It is preferable that the video game processing apparatus is configured so that the point value updating section adds and updates the game point value in accordance with the progress status of the video game, wherein the music reproducing style information contains a volume and a tempo of each of the tracks constituting the music as the reproducing style of the music, and wherein the volume and the tempo of each of the tracks contained in the music reproducing style information rise in accordance with an increase in the game point value.

It is preferable that the video game processing apparatus is configured to further include: an appearance style information storage section configured to store appearance style information, the appearance style information indicating an appearance style of a player character according to the game point value; an appearance style change determining section configured to refer to the game point value updated by the point value updating section and the appearance style information to determine whether the appearance style of the player character is to be changed or not; and an appearance style updating section configured to update the appearance style of the player character to an appearance style according to the game point value updated by the point value updating section in a case where the appearance style change determining section determines that the appearance style is to be changed.

Moreover, a video game processing program product according to the present invention is a video game processing program product for causing a computer to realize a function to control a video game processing apparatus, the video game processing apparatus controlling progress of a video game, the computer including: a music information storage section configured to store music information indicating music, the music being constructed by a plurality of tracks, the music being reproduced with plural kinds of reproducing styles by reproducing an arbitrary combination of one or two or more tracks; and a music reproducing style information storage section configured to store music reproducing style information, the music reproducing style information indicating a reproducing style of music according to a game point value, the game point value denoting a value of a game point that changes in accordance with a progress status of the video game, wherein the video game processing program product causes the video game processing apparatus to realize: a music reproducing function to start reproduction with a reproducing style according to the game point value, the music reproducing function being configured to reproduce the music indicated by the music information; a point value updating function to update the game point value in accordance with the progress status of the video game; a music reproducing style update determining function to refer to the game point value updated by the point value updating function and the music reproducing style information to determine whether the reproducing style of the music reproduced by the music reproducing function is to be updated or not; and a music reproducing style updating function to update the reproducing style of the music reproduced by the music reproducing function to a reproducing style according to the game point value updated by the point value updating function in a case where it is determined in the music reproducing style update determining function that the reproducing style is to be updated.

Effect of the Invention

According to the present invention, it becomes possible to carry out a BGM control according to progress of a video game without giving a user a sense of discomfort.

BRIEF DESCRIPTION OF THE DRAWINGS

FIG. 2 is an explanatory drawing showing an example of a storage state of music information.

FIG. 3 is an explanatory drawing showing an example of a storage state of music reproducing style information.

FIG. 4 is an explanatory drawing showing an example of a storage state of appearance style information.

FIG. 5 is an explanatory drawing showing an example of a storage state of special mode music reproducing style information.

DESCRIPTION OF EMBODIMENT

Hereinafter, an example of one embodiment according to the present invention will be described with reference to the drawings.

Figure 1:
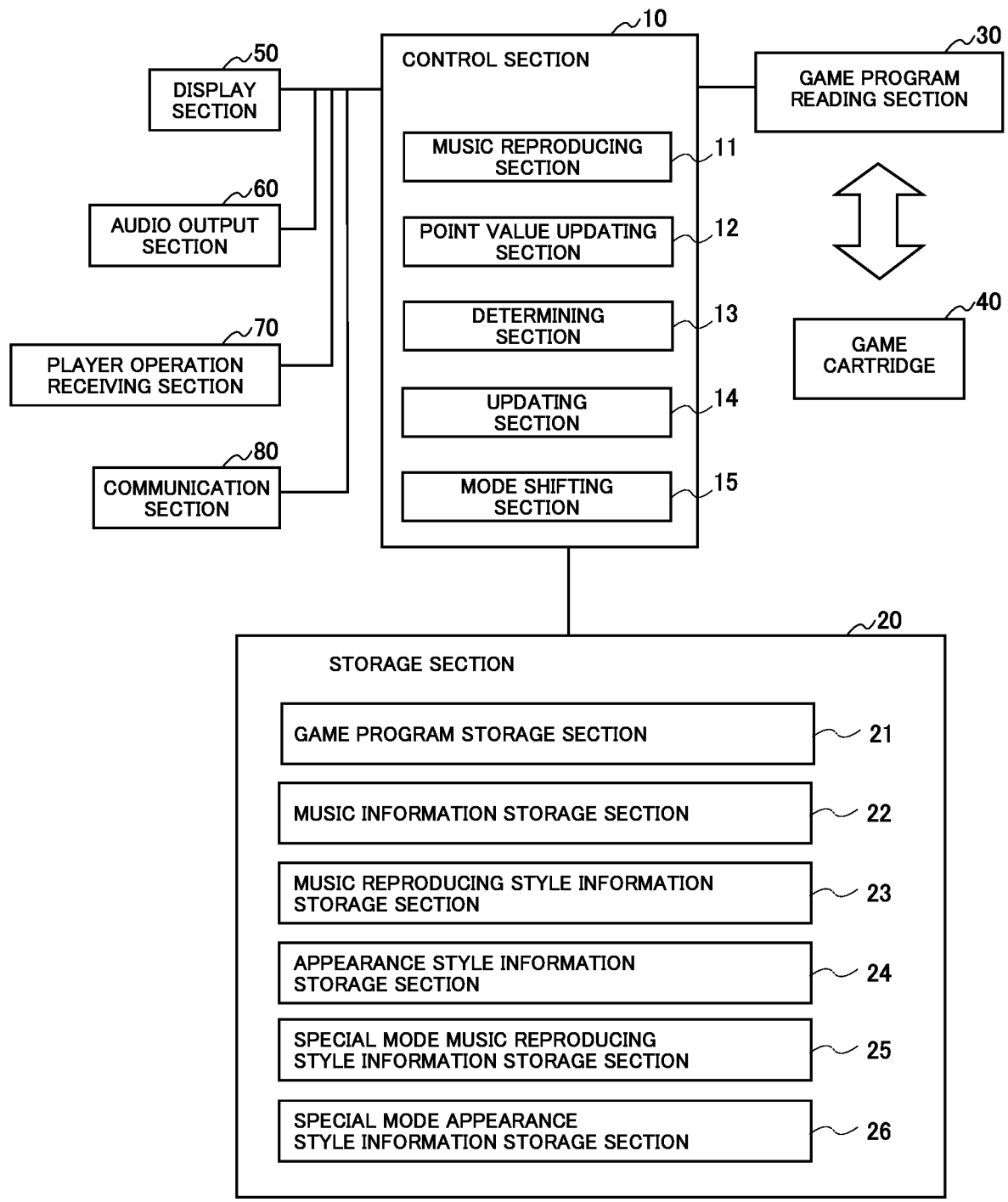
FIG. 1 is a block diagram showing a configuration example of a video game processing apparatus.

FIG. 1 is a block diagram showing an example of a configuration of a video game processing apparatus 100 according to one embodiment of the present invention. As shown in FIG. 1, the video game processing apparatus 100 includes a control section 10, a storage section 20, a game program reading section 30, a game cartridge 40, a display section 50, an audio reproducing section 60, a player operation receiving section 70, and a communication section 80.

The control section 10 contains a CPU, a ROM and the like. The control section 10 has a function to execute a game program read out by the game program reading section 30 and stored in the storage section 20 and to carry out various kinds of controls for causing a video game to proceed in response to an operation of a player. In the present embodiment, the control section 10 includes a music reproducing section 11, a point value updating section 12, a determining section 13, an updating section 14, and a mode shifting section 15.

The music reproducing section 11 has a function to select music according to scenario progress of the video game in accordance with the game program and to reproduce the music. As the music to be reproduced, music indicated by music information stored in a music information storage section 22 is selected.

The point value updating section 12 has a function to carry out a process to update a game point value in accordance with a progress status of the video game. Namely, the game point value is added and updated when a player character applies a damage to an enemy character or when the player character receives a damage from the enemy character. The game point value is configured to be increased and reduced between 0 and 100 in accordance with progress of the video game. In this regard, the point value updating section 12 may be configured so as to subtract and update the game point value when a distance between the player character and the enemy character becomes a constant value or more or when the player character uses, for itself, an in-game item that causes the game point value to be lowered.

The determining section 13 has a function to carry out various kinds of determining processing, such as determining processing whether a reproducing style of reproduced music is to be updated or not (music reproducing style update determining processing), determining processing whether an appearance style of the player character is to be updated or not (appearance style update determining processing), and determining processing whether it can be shifted to a special mode or not (special mode shifting possibility determining processing). More specifically, in the music reproducing style update determining processing, the determining section 13 refers to the updated game point value and music reproducing style information to determines whether the reproducing style of the reproduced music is to be updated or not. In the appearance style update determining processing, the determining section 13 refers to the updated game point value and appearance style information to determine whether the appearance style of the player character is to be updated or not. In special mode shifting possibility determining processing, the determining section 13 refers to the updated game point value to determine whether the video game can be shifted to a special mode or not. In this regard, the special mode will be described later in detail.

The updating section 14 has a function to carry out processing to update a reproducing style of the reproduced music (music reproducing style updating processing) and processing to update an appearance of the player character (appearance style updating processing). In the music reproducing style updating processing, the updating section 14 updates the reproducing style of the reproduced music to a reproducing style according to the updated game point value. Further, in the music reproducing style updating processing, the updating section 14 updates, during the special mode, the reproducing style of the reproduced music to a reproducing style dedicated to the special mode. In the appearance style updating processing, the updating section 14 updates the appearance style of the player character to an appearance style according to the game point value. Further, in the appearance style updating processing, the updating section 14 changes, during the special mode, the appearance style of the player character into an appearance style dedicated to the special mode.

The mode shifting section 15 has a function to carry out a process to shift to the special mode in a case where it is determined that the video game can be shifted to the special mode by the determining section 13.

Here, the "special mode" is a mode to which the video game can be shifted when the game point value becomes a predetermined value. In a case where a predetermined shift request operation is received from a user when the game point value becomes the predetermined value, the mode is shifted to the special mode. The special mode according to the present embodiment is a mode in which a status of the player character is increased dramatically. During the special mode, processings dedicated to the special mode are carried out in various kinds of controls regarding to the progress of the video game, such as a BGM control (for example, the music reproducing style updating processing) and a character appearance style control (for example, the appearance style updating processing). In this regard, the video game may be configured so that, when the game point value becomes the predetermined value, a mode shifting is carried out without receiving a shift request operation from the user.

The storage section 20 is a storage medium for storing a video game program necessary when to cause the video game to proceed and various kinds of data. The storage section 20 is constructed by a non-volatile memory such as a RAM, for example. Various kinds of information registered and updated in accordance with progress of the video game, and various kinds of information read out from a storage medium embedded in the game cartridge 40 and used in the video game are stored in the storage section 20.

In this regard, the video game processing apparatus 100 may be configured so as to download the video game program from a game program providing server (not shown in the drawings) via a communication network such as the Internet and the like and to store the video game program in the storage section 20.

The storage section 20 according to the present embodiment includes a game program storage section 21, the music information storage section 22, a music reproducing style information storage section 23, an appearance style information storage section 24, a special mode music reproducing style information storage section 25, and a special mode appearance style information storage section 26.

The game program storage section 21 is a storage medium for storing various kinds of programs that constitutes the video game program. The video game processing apparatus 100 may be configured so that new programs are stored in the game program storage section 21 in accordance with progress of the video game, or so that all programs used to clear the video game are stored in advance.

The music information storage section 22 is a storage medium for storing music information.

FIG. 2 is an explanatory drawing for showing an example of a storage state of the music information. The music information is information that contains music to be reproduced in the video game. The music contained in the music information is constructed by a plurality of tracks, and is reproduced with plural kinds of reproducing styles by reproducing an arbitrary combination of one or two or more tracks. As shown in FIG. 2, the music stored in the music information is constructed by a plurality of tracks (parts). Further, each of the parts is associated with each of sound data.

In this regard, each part according to the present embodiment, such as "vocal (V)" is constructed so as to contain only one with respect to the music. However, two or more parts may be contained. Further, any other part (for example, a saxophone part, a shout part and the like) may be contained. Namely, the part contained in the music may be any one that constructs (or constitutes) the music.

The music reproducing style information storage section 23 is a storage medium for storing the music reproducing style information. The music reproducing style information is used to determine what kind of reproducing style each track in the music is reproduced.

FIG. 3 is an explanatory drawing showing an example of a storage state of the music reproducing style information. As shown in FIG. 3, the music reproducing style information is information in which a plurality of tracks constituting the music and reproducing styles for respective levels according to the game point value are stored so as to be associated with each other. The music reproducing style information according to the present embodiment contains a volume and a tempo of each track constituting the music as a reproducing style of the music. The music reproducing style information is configured so that the volume and the tempo of each track contained in the music reproducing style information rise in accordance with an increase in the game point value.

In this regard, the volume according to the present embodiment is configured by six stages from "Volume0" to "Volume5". "Volume0" denotes a silent state (a state that no sound is made), and "Volume1" to "Volume5" denote a sound state (a state that a sound is made). The music reproducing style information according to the present embodiment contains tracks each of which is updated in the reproducing style from the silent state ("Volume0" in the present embodiment) to the sound state ("Volume1 to Volume5" in the present embodiment). Further, a magnitude correlation of the volumes is configured so that the volume becomes larger as the reproducing style becomes closer to "Volume5". Further, the "tempo" according to the present embodiment is configured so that all of the tempos of the respective tracks contained in the one piece of music are the same as each other even though the reproducing style is any reproducing style. Namely, the tempos of the respective tracks when the reproducing style for "music A" is "level2" are stored as "♪=65" for all of "vocal", "guitar", "base", and "drum".

Further, the "level" in the music reproducing style information according to the present embodiment is used to classify the reproducing styles into multiple stages, and corresponds to the game point value. The "level" is configured so that a level1 corresponds to a game point value "zero or more and under 10" (0≤point value (p)<10), a level2 corresponds to a game point value "10 or more and under 20" (10≤point value (p)<20), . . . , and a level10 corresponds to a game point value "90 or more and 100 or less (90≤point value (p)≤100). Namely, the "level" in the music reproducing style information according to the present embodiment is configured so as to shift to next level whenever 10 of the game point value is accumulated. In other words, the video game processing apparatus 100 is configured so as to update the reproducing style of the music whenever 10 of the game point value is accumulated. In this regard, the music reproducing style information is not limited to a configuration in which "levels" divided into 10 stages like the present embodiment is used. For example, the music reproducing style information may be configured so as to calculate a volume according to the game point value using functions. Namely, the music reproducing style information may be configured so as to contain information by which a volume according to the game point value can be determined.

The appearance style information storage section 24 is a storage medium for storing appearance style information. The appearance style information is referred to when an appearance style of a character is to be updated.

FIG. 4 is an explanatory drawing showing an example of a storage state of the appearance style information. As shown in FIG. 4, the appearance style information is information in which a character type and appearance styles of respective levels according to the game point value are stored so as to be associated with each other. In this regard, the appearance style information according to the present embodiment is configured so as to provide four stages of levels according to the game point value as thresholds for updating the appearance style. However, the appearance style information may be configured in any manner so long as the appearance style can be determined in accordance with the game point value.

The special mode music reproducing style information storage section 25 is a storage medium for storing special mode music reproducing style information. The special mode music reproducing style information is used for determining a reproducing style of music when the player character shifts to the special mode.

FIG. 5 is an explanatory drawing showing an example of a storage state of the special mode music reproducing style information. The special mode music reproducing style information is information indicating a reproducing style of respective kinds of music in the special mode. As shown in FIG. 5, the special mode music reproducing style information according to the present embodiment includes a volume and a tempo of each of tracks that constitute the music.

The special mode appearance style information storage section 26 is a storage medium for storing special mode appearance style information. The special mode appearance style information is used for determining an appearance style of the player character when the player character shifts to the special mode.

The game program reading section 30 has a function to read out a necessary video game program from a storage medium in which various kinds of video game programs are stored is embedded. In this regard, in the present embodiment, the game program reading section 30 has amounting section for detachably mounting the game cartridge 40, in which the video game program is stored, therein. The game program reading section 30 reads out the video game program from the storage medium of the game cartridge 40, which is mounted into the mounting section by the player (an operator (or a user) of the video game processing apparatus 100), to store the read-out video game program in the storage section 20. In this regard, the video game carried out in accordance with the video game program and used in the present embodiment may be any type of video game such as an action game, an RPG and the like as long as it is a video game in which music is reproduced in accordance with progress of the video game.

The display section 50 is a display device that displays a game screen according to the progress of the video game and a player operation in accordance with the control of the control section 10. The display section 50 may be configured so as to be integrated with the video game processing apparatus 100, for example, or may be configured so as to be provided outside the video game processing apparatus 100.

The audio reproducing section 60 reproduces a voice (or an audio sound) in response to the progress of the video game and the player operation in accordance with the control of the control section 10. In the present embodiment, the audio reproducing section 60 reproduce the sound data of each track stored in the music information and sound for an action of the player character.

The player operation receiving section 70 receives an operational signal in response to an operation of the player, and notifies the control section 10 of the result.

The communication section 80 connects the video game processing apparatus 100 to a communication network such as the Internet by means of a wireless or wired manner to transmit and receive various kinds of information.

Next, an operation of the video game processing apparatus 100 according to the present embodiment will be described. In this regard, the content of an operation and/or processing with no relationship to the present invention may be omitted.

Figure 6:
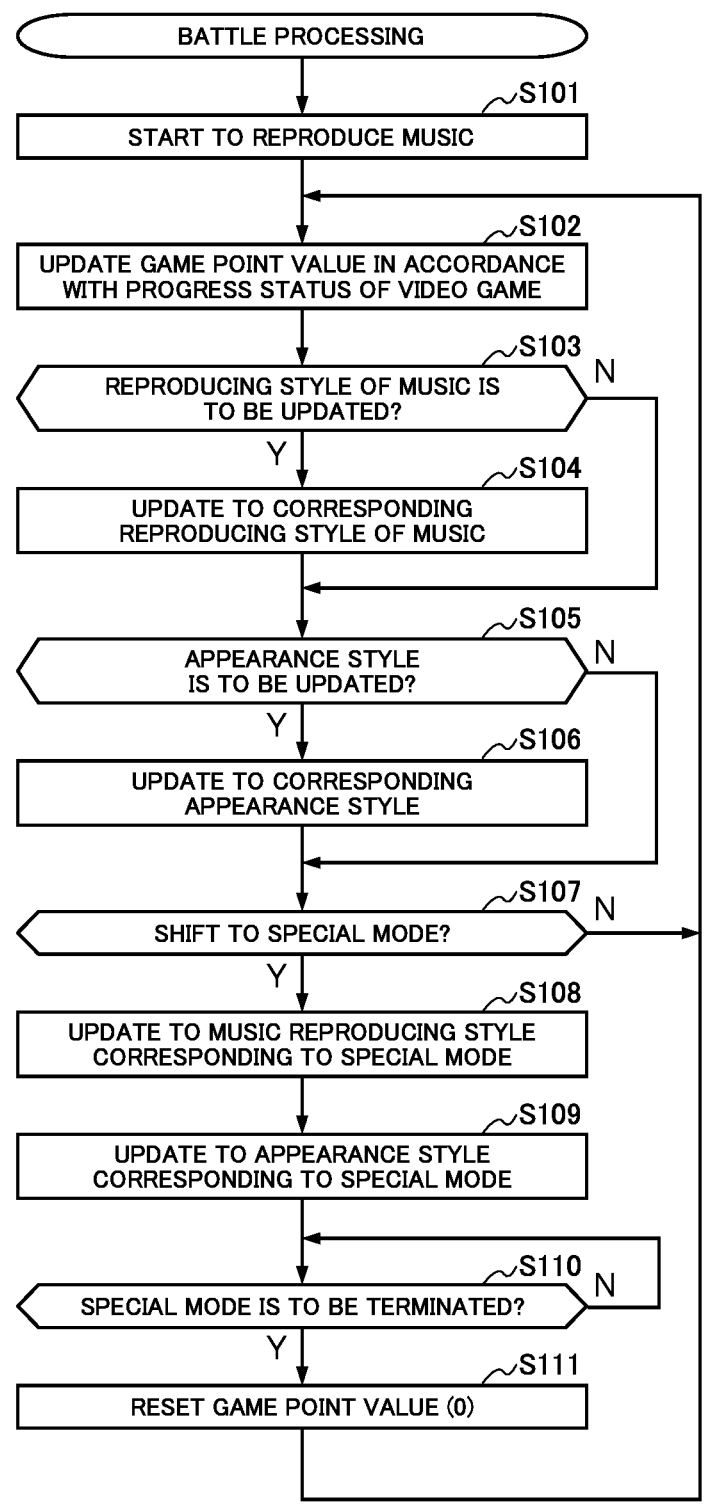
FIG. 6 is a flowchart showing an example of battle processing.

FIG. 6 is a flowchart showing an example of battle processing in the video game processing apparatus 100. The battle processing is started when requirements for start of a battle between the player character operated by the user and the enemy character operated by the control section 10 are satisfied in accordance with the progress of the video game.

In the battle processing, the control section 10 first starts to reproduce music indicated by music information using a reproducing style according to a game point value (Step S101). Namely, the control section 10 selects music to be reproduced from the music information; refers to the music reproducing style information and the game point value to determine a reproducing style of the selected music; and reproduces the music on the basis of the determined reproducing style. In this regard, the control section 10 according to the present embodiment starts reproducing a plurality of tracks constituting one piece of music at the same time by matching start positions of the plurality of tracks. Namely, the control section 10 reproduces the one piece of music as the BGM by reproducing the plurality of tracks so as to be superimposed.

Here, reproduction starting processing for music according to the present embodiment will be described specifically. Here, a case where music to be reproduced is the music A and a battle is started in a state that the game point value is zero will be described specifically as an example. As shown in FIG. 2, the music A is first constructed by four tracks of "vocal", "guitar", "base" and "drum". As shown in FIG. 3, a level corresponding to the game point value "0" in the music reproducing style information is "level1". Therefore, a track for "vocal" is reproduced at "Volume1/♪=60", a track for "guitar" is reproduced at "Volume0/♪=60", a track for "base" is reproduced at "Volume0/♪=60", and a track for "drum" is reproduced at "Volume1/♪=60". Namely, in a case where music to be reproduced is music A and a battle is started in a state that the game point value is zero, all of the tracks are reproduced in the inside of the video game processing apparatus 100, but the video game processing apparatus 100 carries out reproducing processing for the music so that the user is allowed to listen only sounds of the "vocal" and the "drum".

Further, the video game processing apparatus 100 may be configured so as to refer to the appearance style information and the game point value when to reproduce the music, and determine an appearance style of the player character. Namely, the video game processing apparatus 100 can be configured so as to, when to start reproducing the music, determine a reproducing style of the music and determine the appearance style of the player character.

In this regard, when to carry out the reproduction starting processing for the music, the control section 10 selects music indicated by the music information in accordance with a predetermined selection rule. As the predetermined selection rule, a rule to refer to information in which the player character is associated with the music to select music corresponding to the player character, a rule to refer to information in which the enemy character is associated with the music to select the music corresponding to the enemy character, a rule to refer to information in which the game point value is associated with the music to select the music corresponding to the game point value when a battle is started, and the like are used, for example.

When the reproduction of the music is started, the control section 10 updates the game point value in accordance with the progress status of the video game (Step S102). Namely, the control section 10 updates the game point value in response to a situation in which the player character gave a damage to the enemy character or a situation in which the player character received a damage from the enemy character.

On the other hand, when the game point value is updated, the control section 10 determines whether a reproducing style of the reproduced music is to be updated or not (Step S103). Namely, the control section 10 refers to the updated game point value and the music reproducing style information, and determines whether the reproducing style of the reproduced music is to be updated or not. In the present embodiment, the music reproducing style information is information in which the level corresponding to the game point value is set up. For this reason, it is determined whether the updated game point value becomes a game point value corresponding to a level different from the current level or not.

In a case where it is determined that the reproducing style of the reproduced music is not to be updated ("No" at Step S103), the control section 10 does not update the reproducing style, and refers to the appearance style information to determine whether the appearance style is to be updated or not (Step S105).

On the other hand, in a case where it is determined that the reproducing style of the reproduced music is to be updated ("Yes" at Step S103), the control section 10 updates the reproducing style of the music to a reproducing style for a level corresponding to the game point value (Step S104).

Here, the updating processing for the reproducing style of the music according to the present embodiment will be described specifically. In this case, a case where music to be reproduced is music A and the game point value is updated to 10 after a battle is started in a state that the game point value is zero will be described specifically as an example. When the game point value becomes 10, as shown in FIG. 3, the level of the reproducing style is changed from "level1" to "level2". Therefore, the track for "vocal" is reproduced at "Volume1/♪=60", the track for "guitar" is reproduced at "Volume1/♪=60", the track for "base" is reproduced at "Volume1/♪=60", and the track for "drum" is reproduced at "Volume1/♪=60". For that reason, the video game processing apparatus 100 reproduces the music with the reproducing style, in which the sounds of only "vocal" and "drum" can be heard, when a battle is started in a state that the music to be reproduced is the music A and the game point value is zero. The video game processing apparatus 100 then reproduces the music with the reproducing style, in which the sounds of "guitar" and "base" can also be heard, in a case where the game point value becomes 10. Namely, the user gets the impression that the sounds are added to the previous sounds so as to be synchronized with the previous sounds in accordance with the progress status of the video game. According to such a configuration, even in a case where a rendering that gives the user a feeling add a track is carried out, it becomes possible to carry out an additional rendering of the track without generating a deviation in introducing timing of an additional track in the present embodiment, the track that becomes the sound state from the silent state).

When the reproducing style of the music is updated, the control section 10 refers to the appearance style information to determine whether the appearance style is to be updated or not (Step S105).

In a case where it is determined that the appearance style of the player character is not to be updated ("No" at Step S105), the control section 10 determines whether the appearance style is to be shifted to the special mode without update or not (Step S107). On the other hand, in a case where it is determined that the appearance style of the player character is to be updated ("Yes" at Step S105), the control section 10 refers to the appearance style information to update the appearance style to an appearance style with a level corresponding to the game point value (Step S106). In a case where it is determined that the appearance style is to be updated, the control section 10 determines whether the appearance style is to be shifted to the special mode or not (Step S107).

In a case where it is determined that the appearance style is not to be shifted to the special mode ("No" at Step S107), the control section 10 causes the processing flow to return to Step S102, and carries out the process to update the game point value in accordance with the progress of the video game.

On the other hand, in a case where it is determined that the appearance style is to be shifted to the special mode ("Yes" at Step S107), the control section 10 refers to the special mode music reproducing style information to update the reproducing style of the reproduced music to a reproducing style during the special mode (Step S108), and refers to the special mode appearance style information to update the appearance style of the player character to an appearance style during the special mode (Step S109).

Here, the updating processing for the reproducing style of the music when the video game is shifted to the special mode according to the present embodiment will be described specifically. Here, a case where music to be reproduced is music A and mode shifting becomes possible when the game point value is 90 or more will be described specifically as an example. A level of the music reproducing style when the game point value is 90 is 10, as shown in FIG. 3. When the level of the music reproducing style becomes 10, as shown in FIG. 3, the track for the "vocal" is reproduced at "Volume3/♪=100", the track for the "guitar" is reproduced at "Volume3/♪=100", the track for the "base" is reproduced at "Volume3/♪=100", and the track for the "drum" is reproduced at "Volume3/♪=100". When a mode shifting request operation is received from the user in such a reproducing style, the control section 10 carries out mode shifting processing to shift the mode of the player character to the special mode. When to shift to the special mode, as shown in FIG. 5, the track for the "vocal" is reproduced at "Volume5/♪=130", the track for the "guitar" is reproduced at "Volume4/♪=130", the track for the "base" is reproduced at "Volume4/♪=130", and the track for the "drum" is reproduced at "Volume4/♪=130". Therefore, the video game processing apparatus 100 can reproduce the music with the reproducing style using the volume and the tempo of the music different from those in a normal mode so as to be matched with a portion to be livened up further in the video game without taking any account of a sound break and the like when the reproducing styles are changed.

When the music reproducing style and the appearance style are respectively updated to the music reproducing style and appearance style during the special mode, the control section 10 determines whether the special mode is to be terminated or not (Step S110). In a case where it is determined that the special mode is not to be terminated ("No" at Step S110), the control section 10 determines whether the special mode is to be terminated or not again. Namely, the control section 10 repeats the process at Step S110 until it is determined that the special mode is to be terminated.

On the other hand, in a case where it is determined that the special mode is to be terminated ("Yes" at Step S110), the control section 10 terminates the special mode, resets the game point value (Step S111), and causes the processing flow to shift to the process at Step S102 to update the game point value in accordance with the progress status of the video game.

As explained above, in the embodiment described above, the video game processing apparatus 100 for controlling progress of a video game is configured so as to include: the music information storage section 22 configured to store music information indicating music, the music being constructed by a plurality of tracks, the music being reproduced with plural kinds of reproducing styles by reproducing an arbitrary combination of one or two or more tracks; and the music reproducing style information storage section 23 configured to store music reproducing style information, the music reproducing style information indicating a reproducing style of music according to a game point value, the game point value denoting a value of a game point that changes in accordance with the progress status of the video game, and so as to: start reproduction with a reproducing style according to the game point value and reproduce the music indicated by the music information (for example, Step S101); update the game point value in accordance with the progress status of the video game (for example, Step S102); refer to the updated game point value and the music reproducing style information to determine whether the reproducing style of the reproduced music is to be updated or not (for example, Step S103); and update the reproducing style of the reproduced music to a reproducing style according to the updated game point value in a case where it is determined that the reproducing style is to be updated (for example, Step S104). Therefore, the video game processing apparatus 100 is configured so that the reproducing style of the reproduced music is updated in accordance with the progress status of the video game, such as a situation that the player character gives the enemy character a damage. For this reason, it becomes possible to carry out the BGM control according to progress of the video game without giving the user a sense of discomfort.

In particular, the video game processing apparatus 100 is configured so as to add and update the game point value in accordance with the progress status of the video game; and so that the music reproducing style information contains the volume and the tempo of each track constituting the music as a reproducing style of the music and the volume and the tempo rise in accordance with an increase in the game point value. Therefore, it becomes possible to control the BGM so that a melody of the music is livened up gradually in accordance with the progress of the video game.

Further, in the embodiment described above, the video game processing apparatus 100 is configured so as to: start reproducing a plurality of tracks constituting one piece of music at the same time by matching start positions of the plurality of tracks; and update the reproducing style so that the tempo of each track contained in the reproduced music is different from each other. Therefore, even in a case where the reproducing style of each track is updated to a different reproducing style, it becomes possible to carry out the BGM control according to progress of the video game smoothly without giving the user a sense of discomfort.

Further, in the embodiment described above, the music reproducing style information is configured so as to contain tracks that switches from a silent state (for example, "Volume0") to a sound state (for example, "Volume1 to Volume5") in the reproducing style. Therefore, even in a case where the rendering that gives the user a feeling add a track is carried out, it becomes possible to carry out the additional rendering of the track without generating a deviation in introducing timing of an additional track (that is, the track that becomes the sound state from the silent state). Therefore, it becomes possible to carry out the BGM control according to progress of the video game smoothly without giving the user a sense of discomfort.

Further, in the embodiment described above, the video game processing apparatus 100 is configured so as to: include the special mode music reproducing style information storage section 25, the special mode music reproducing style information indicating a reproducing style of the music in a special mode, the special mode denoting a mode to which the video game is shifted when a predetermined condition is satisfied; refer to the updated game point value to determine whether the video game can be shifted to the special mode or not (for example, Step S107); and update the reproducing style of the reproduced music (for example, Step S108) and shift the video game to the special mode (for example, Steps S108, S109) in a case where it is determined that the video game can be shifted to the special mode. Therefore, it becomes possible for the user to intuitively grasp a rendering regarding a high-priority portion in the video game in a smooth manner without giving the user a sense of discomfort.

Further, in the embodiment described above, the video game processing apparatus 100 is configured so as to: include the appearance style information storage section 24 configured to store the appearance style information, the appearance style information indicating an appearance style of a player character according to the game point value; refer to the updated game point value and the appearance style information to determine whether the appearance style of the player character is to be changed or not (for example, Step S105); and update the appearance style of the player character to an appearance style according to the updated game point value in a case where it is determined that the appearance style is to be changed (for example, Step S106). Therefore, it becomes possible to allow the user to grasp an accumulating degree of the game point and a progress degree of the video game more intuitively.

INDUSTRIAL APPLICABILITY

According to the present invention, it is useful to carry out a BGM control according to progress of a video game without giving a user a sense of discomfort.

DESCRIPTION OF REFERENCE NUMERALS 100 video game processing apparatus
10 control section 11 music reproducing section
12 point value updating section
13 determining section
14 updating section
15 mode shifting section
20 storage section
21 game program storage section
22 music information storage section
23 the music reproducing style information storage section
24 appearance style information storage section
25 the special mode music reproducing style information storage section
26 special mode appearance style information
30 game program reading section
40 game cartridge
50 display section
60 audio reproducing section
70 player operation receiving section
80 communication section

The invention claimed is:

1. A video game processing apparatus for controlling progress of a video game, comprising:
    a music information memory storage configured to store music information indicating music, the music being constructed by a fixed number of plurality of tracks, each of the plurality of tracks including volume level data indicating a volume at which to be reproduced, the music being reproduced by reproducing an arbitrary combination of two or more tracks, and the music is configured to be reproduced according to plural kinds of reproducing styles;
    a music reproducing style information memory storage configured to store music reproducing style information, the music reproducing style information indicating a reproducing style of music according to a game point value, the game point value denoting a value of a game point that is accumulated in accordance with a progress status of the video game;
    a music reproducing processor circuit configured to start reproduction of the music with a reproducing style among a plurality of reproduction styles available according to the game point value, each of the plurality of reproduction styles having different volume level data for at least one the plurality of tracks, the music reproducing processor circuit being configured to reproduce the music indicated by the music information;
    a point value updating processor circuit configured to update the game point value in accordance with the progress status of the video game;
    a music reproducing style update determining processor circuit configured to refer to the game point value updated by the point value updating processor circuit to determine whether the reproducing style of the music reproduced by the music reproducing processor circuit is to be updated or not;
    a music reproducing style updating processor circuit configured to update the reproducing style of the music reproduced by the music reproducing processor circuit to a reproducing style according to the accumulated game point value updated by the point value updating processor circuit in a case where the music reproducing style update determining processor circuit determines that the reproducing style is to be updated, wherein individual tracks of the fixed number of tracks included in the music being reproduced is independently set for reproduction when the reproducing style of the music is updated, and wherein volume level data of one of the individual tracks is modified to be zero such that the one of the individual tracks generates no sound when the reproducing style of the music is updated;
    a special mode music reproducing style information memory storage configured to store special mode music reproducing style information, the special mode music reproducing style information indicating a reproducing style of the music in a special mode, the special mode denoting a mode to which the video game is shifted when a predetermined condition is satisfied;
    a special mode shifting possibility determining processor circuit configured to refer to the game point value updated by the point value updating processor circuit to determine whether the video game can be shifted to the special mode or not; and
    a special mode shifting processor circuit configured to refer to the special mode music reproducing style information memory storage to update the reproducing style of the music reproduced by the music reproducing processor circuit and to shift the video game to the special mode in a case where the special mode shifting possibility determining processor circuit determines that the video game can be shifted to the special mode,
    wherein the number of tracks included in the music being reproduced remains the same when the reproducing style of the music is updated to the special mode,
    wherein the arbitrary combination of the two or more tracks being reproduced is same before and after the updating of the music reproducing style,
    wherein each track of the two or more tracks being reproduced includes underlying sound data to be reproduced,
    wherein the reproducing style is directed to a manner in which the sound data is reproduced to output a sound, and
    wherein the progress status indicates a change in game state effectuated by a game character.

2. The video game processing apparatus according to claim 1,
    wherein the point value updating processor circuit adds and updates the game point value in accordance with the progress status of the video game,
    wherein the music reproducing style information contains a volume and a tempo of each of the tracks constituting the music as the reproducing style of the music, and
    wherein the volume and the tempo of each of the tracks contained in the music reproducing style information rise in accordance with an increase in the game point value.

3. The video game processing apparatus according to claim 2, further comprising:
    an appearance style information memory storage configured to store appearance style information, the appearance style information indicating an appearance style of a player character according to the game point value;
    an appearance style change determining processor circuit configured to refer to the game point value updated by the point value updating processor circuit and the appearance style information to determine whether the appearance style of the player character is to be changed or not; and
    an appearance style updating processor circuit configured to update the appearance style of the player character to an appearance style according to the game point value updated by the point value updating processor circuit in a case where the appearance style change determining processor circuit determines that the appearance style is to be changed.

4. The video game processing apparatus according to claim 1, further comprising:
an appearance style information memory storage configured to store appearance style information, the appearance style information indicating an appearance style of a player character according to the game point value;
an appearance style change determining processor circuit configured to refer to the game point value updated by the point value updating processor circuit and the appearance style information to determine whether the appearance style of the player character is to be changed or not; and
an appearance style updating processor circuit configured to update the appearance style of the player character to an appearance style according to the game point value updated by the point value updating processor circuit in a case where the appearance style change determining processor circuit determines that the appearance style is to be changed.

5. The video game processing apparatus according to claim 1,
wherein the point value updating processor circuit adds and updates the game point value in accordance with the progress status of the video game,
wherein the music reproducing style information contains a volume and a tempo of each of the tracks constituting the music as the reproducing style of the music, and
wherein the volume and the tempo of each of the tracks contained in the music reproducing style information rise in accordance with an increase in the game point value.

6. The video game processing apparatus according to claim 5, further comprising:
an appearance style information memory storage configured to store appearance style information, the appearance style information indicating an appearance style of a player character according to the game point value;
an appearance style change determining processor circuit configured to refer to the game point value updated by the point value updating processor circuit and the appearance style information to determine whether the appearance style of the player character is to be changed or not; and
an appearance style updating processor circuit configured to update the appearance style of the player character to an appearance style according to the game point value updated by the point value updating processor circuit in a case where the appearance style change determining processor circuit determines that the appearance style is to be changed.

7. The video game processing apparatus according to claim 1, further comprising:
an appearance style information memory storage configured to store appearance style information, the appearance style information indicating an appearance style of a player character according to the game point value;
an appearance style change determining processor circuit configured to refer to the game point value updated by the point value updating processor circuit and the appearance style information to determine whether the appearance style of the player character is to be changed or not; and
an appearance style updating processor circuit configured to update the appearance style of the player character to an appearance style according to the game point value updated by the point value updating processor circuit in a case where the appearance style change determining processor circuit determines that the appearance style is to be changed.

8. The video game processing apparatus according to claim 1, wherein the reproducing style of a track constituting the music is updated while the music is being reproduced.

9. The video game processing apparatus according to claim 1, wherein the reproducing style of the music is updated by a track constituting the music.

10. The video game processing apparatus according to claim 1, wherein the reproducing style of the music is updated when a player character receives damage from an enemy character.

11. The video game processing apparatus according to claim 1, wherein the reproducing style of the music is updated when a player character causes damage to an enemy character.

12. The video game processing apparatus according to claim 1, wherein each of the individual tracks of the music correspond to a sound produced by a musical instrument.

13. The video game processing apparatus according to claim 1, wherein each of the individual tracks of the music included in the music is played even when sound of one or more of the individual tracks is not produced.

14. The video game processing apparatus according to claim 1, wherein underlying sound data of each of the individual tracks of the music remains same before and after the updating of the music reproducing style.

15. The video game processing apparatus according to claim 1, wherein the plurality of tracks is set to be played together when the music is played.

16. The video game processing apparatus according to claim 1, wherein the reproducing style of the music is updated when a specific level is achieved in the video game.

17. The video game processing apparatus according to claim 1, wherein the plurality of reproducing styles corresponds to a plurality of different levels in the video game, and each of the plurality of different levels corresponds to a different range of point values in the video game.

18. The video game processing apparatus according to claim 17, wherein volume level data of at least one of the plurality of tracks for each of the plurality of different levels is different from one another.

19. A video game processing program product for causing a computer to control a video game processing apparatus, the video game processing apparatus controlling progress of a video game,
the computer comprising:
a music information memory storage configured to store music information indicating music, the music being constructed by a fixed number of plurality of tracks, each of the plurality of tracks including volume level data indicating a volume at which to be reproduced, the music being reproduced with plural kinds of reproducing styles by reproducing an arbitrary combination of two or more tracks;
a music reproducing style information memory storage configured to store music reproducing style information, the music reproducing style information indicating a reproducing style of music according to a game point value among a plurality of reproduction styles available, each of the plurality of reproduction styles having different volume level data for at least one the plurality of tracks, the game point value denoting a value of a game point that accumulates in accordance with a progress status of the video game; and a special mode music reproducing style information memory storage configured to store special mode music reproducing style information, the special mode music reproducing style information indicating a reproducing style of the music in a special mode, the special mode denoting a mode to which the video game is shifted when a predetermined condition is satisfied, the video game processing program product causing the video game processing apparatus to execute:

starting reproduction of the music with a reproducing style according to the game point value, the reproduction including reproducing the music indicated by the music information;

updating the game point value in accordance with the progress status of the video game;

determining, by referring to the updated game point value, whether the reproducing style of the music being reproduced is to be updated or not;

updating the reproducing style of the music being reproduced to a reproducing style according to the updated accumulated game point value in a case where it is determined that the reproducing style is to be updated, wherein individual tracks of the fixed number of tracks included in the music being reproduced is independently set for reproduction when the reproducing style of the music is updated, and wherein volume level data of one of the individual tracks is modified to be zero such that the one of the individual tracks generates no sound when the reproducing style of the music is updated;

determining, by referring to the game point value updated by the point value updating processor circuit, whether the video game can be shifted to the special mode or not; and updating, by referring to the special mode music reproducing style information memory storage, the reproducing style of the music reproduced by the music reproducing processor circuit to shift the video game to the special mode in a case where the special mode shifting possibility determining processor circuit determines that the video game can be shifted to the special mode, wherein the number of tracks included in the music being reproduced remains the same when the reproducing style of the music is updated to the special mode, wherein the arbitrary combination of the two or more tracks being reproduced is same before and after the updating of the music reproducing style, wherein each track of the two or more tracks being reproduced includes underlying sound data to be reproduced, wherein the reproducing style is directed to a manner in which the sound data is reproduced to output a sound, and wherein the progress status indicates a change in game state effectuated by a game character.

* * * * *